June 17 1924.  
E. HOPKINSON  
1,497,752
TIRE VULCANIZING APPARATUS
Filed Oct. 11, 1923
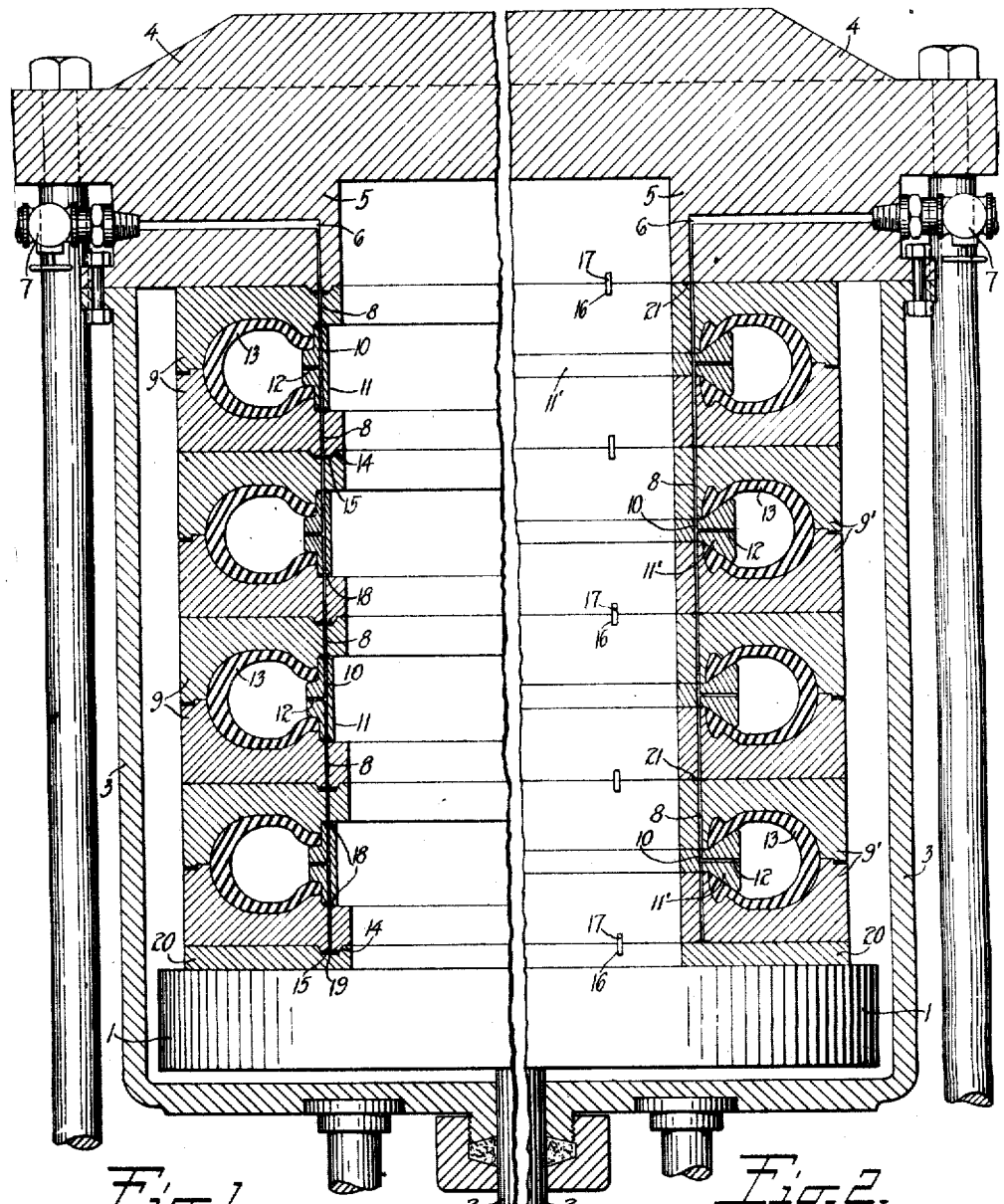
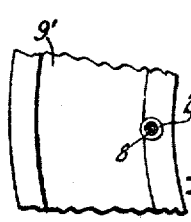
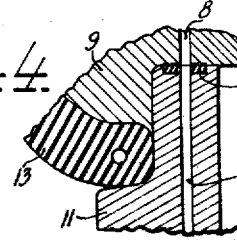
Inventor  
ERNEST HOPKINSON  
Attorney Patented June 17, 1924.

1,497,752

UNITED STATES PATENT OFFICE.

ERNEST HOPKINSON, OF NEW YORK, N. Y.

TIRE-VULCANIZING APPARATUS.

Application filed October 11, 1923. Serial No. 667,846.

*To all whom it may concern:*

Be it known that I, ERNEST HOPKINSON, a citizen of the United States, residing at New York city, county of New York, and State of New York, have invented a certain new and useful Tire-Vulcanizing Apparatus, of which the following is a full, clear, and exact description.

This invention relates to the manufacture of hollow rubber articles, particularly pneumatic tire casings, or the like, having an annular internal cavity.

It is often desirable to apply to the inner wall of tire casings during their vulcanization an internal fluid pressure. Various apparatus has been suggested heretofore for accomplishing this purpose. But so far as known, all prior constructions of "manifold," as they are known in the art, have consisted of auxiliary parts or appurtenances located either inside or outside of the molds while stacked in a press, or located outside of the press with branch connections through the walls of the vulcanizing vessel.

The present invention aims to provide a new and improved construction for carrying on the so-called "manifold process", a form of construction which is exceedingly simple, dispenses with attachments or appurtenances, enables the operations at the vulcanizers to be performed more rapidly and the vulcanizing cycle in the press-room shortened, and possesses other advantages that will be apparent to those skilled in the art.

With the illustrated embodiments of the invention in mind but without intention to limit its scope more than is required by the prior art, the discovery, briefly stated, consists in forming ducts in the several sections of each mold and branch passages communicating with each tire-receiving cavity, and in positioning a series of the molds between clamping members or press platens with interposed sealing means between the several molds and the sections of each mold so as to constitute the ducts when registered a header through which fluid under pressure may be applied to the inner walls of the tires.

Embodiments of the invention are illustrated in the accompanying drawings, in which:—

Figure 1 is a vertical section through a vulcanizer of the French press type, half of the apparatus only being shown;

Figure 2 is a similar vertical section showing a modification;

And Figures 3 and 4 are enlarged details in plan and section, respectively, of the sealing means for closing cracks or joints between molds and their sections.

The invention is shown in the drawings as applied to a French press, having a lower platen 1, vertically movable by a ram 2, within a chamber or shell 3, the upper end or mouth of which is adapted to be closed by an upper platen or head 4, which may either be fixed, in which case the shell 3 is moved upwardly towards it, or movable to one side by means, not shown, but well-known to those skilled in the art. Steam, or other suitable heating fluid, is adapted to be supplied to the interior of the shell 3, as well-known, to raise the molds to a proper temperature for carrying on vulcanization.

Fluid under pressure may be supplied to a point within the vulcanizing press in various ways but for the sake of simplicity, I have shown the head 4 equipped with a depending flange 5, which is drilled, as indicated at 6, to provide a passageway from an outside valve-controlled line 7.

According to the invention, a header is constituted by ducts 8 in the several mold sections 9, which are adapted to be registered with ducts 10, in so-called metallic "sealing-rings" 11, the latter being also provided with branches 12 communicating with the interior of tires 13, which are mounted in the molds. In Figure 1, the equipment illustrated is suitable for vulcanizing straight-side casings whereas in Figure 2, the equipment illustrated is suitable for clincher casings, the mold sections indicated at 9' and the sealing-ring indicated at 11' in Figure 2 differing only slightly in cross-section from the corresponding parts shown in Figure 1, the ducts and passages being similar in both cases and the constructions being functionally identical. The sections of each mold, preferably, have the usual dowel pins, not shown, for insuring their assemblage in proper relation with the ducts 8 and 10 in registration. The operator may be relied upon to locate the molds so that the holes through one assembled mold will register with those contiguous it. But it is preferred to provide some additional mechanical means for insuring proper registration of the various molds, such as the circular bosses shown at 14 in Figure 1, which are received within sockets 15 of the adjacent mold, or to provide notches 16 for the reception of plates 17, as illustrated in Figure 2. These and other expedients may be provided on the inside or outside peripheries of the molds to insure the proper relative positioning of the several molds.

To seal the joints between the sections of each mold about the line of the registrable ducts 8 and 10, a washer of any suitable sealing material may be employed. This sealing, of course, is to constitute the aligned ducts 8 and 10 in all the molds a header. In Figures 1 and 4, a washer of lead is indicated at 18, this being preferably made of the thickness indicated in dotted lines in Figure 4 so that when the molds are finally pressed together, the lead 18 will be squeezed tightly and collapsed, and the passageway completed from the supply passage 6 through to the bottommost mold, the duct of which is preferably closed or "dead ended" by a disk 19 of lead, or with any other suitable means. In the drawings, a dummy section 20 is shown resting directly on the bottom platen but, obviously, the bottom platen 1 might be utilized, if desired. Of course, any suitable means might be used to close up the duct 8 in the lower mold section, such, for instance, as a plug forced anywhere in the header between the lower platen and the bottommost branch passage 12.

In Figure 2 of the drawings, the joints between the sections of each mold and between the several molds are illustrated as being closed by a thin apertured wafer 21 of rubber, which is preferably of vulcanized composition. A coating of a thick cement, preferably of a quick-curing character, might be employed, as also any material of a character that will seal the cracks or joints in the several parts.

In operation, a batch of molds that have been through a heat are opened up, tires removed therefrom and replaced with uncured casings, these having been mounted on sealing-rings, such as shown at 11 and 11'. The molds are then each closed and as a unit transported to the mouth of a vulcanizing press. If this be of the French press type, that is, having an upright steam chamber or shell 3, in which vertically reciprocates a platen, they are stacked one upon another in vertical alignment, the operators taking care to register the passages in the several mold sections, either with means of their own devising or those shown in the drawings. Then, the press is closed and the ram 2 operated so as to powerfully clamp together the many sections of the molds. In the operation of closing the press platens, the collapsible material 18—21, whatever may be its nature, is mashed or compressed so as to constitute the several ducts 8 and 10 a header. These ducts being in line with the supply passage 6, fluid under pressure from an outside source may be supplied by opening up the valve-controlled line 7, which may be either cut off when the requisite pressure has been attained within the tires or may be left in communication with the outside source of pressure, as the circumstances may require.

At the end of a curing heat, the press is opened up as heretofore and the mold removed and prepared for another vulcanizing treatment. If lead, or other similar collapsible material, is used, it may be melted and reformed or discarded entirely, the quantity required being small.

The advantages of the invention have already been enumerated, in part at least. The simplicity and fool-proof character of the construction for manifolding will commend themselves to those skilled in the art.

While the invention has been illustrated and described in connection with a French type of vulcanizing press, where the loading movements of the molds is generally vertical, it is not to be understood as so limited as it may be applied to any other type of vulcanizing press, such, for instance, as one in which the ram is operated horizontally, the molds lying in approximately vertical planes. In the claims, the term "sections" is used to comprehend not only the inner and outer shells of a mold but also the previously mentioned sealing-ring as this latter also functions as a mold part.

As many changes can be made in the details of the construction without departure from the underlying principles, reference should be made to the accompanying claims for an understanding of the breadth and scope of the invention, it being intended to comprehend therein the invention as fully and completely as the prior art permits.

Having thus described my invention, what I claim and desire to protect by Letters Patent is:—

1. A vulcanizing apparatus including press members for subjecting molds to treatment, in combination with, means provided in each of the molds for conducting fluid under pressure to their interiors, sealing means for constituting said first-mentioned means a header upon closure of the press members, and means for conducting fluid under pressure to said header.

2. A vulcanizing apparatus including press members for subjecting molds to treatment, one of said press members being provided with a passage, in combination with, a plurality of molds, each of said molds consisting of a plurality of sections provided with registrable ducts, one of said sections of each mold having a branch duct communicating with the tire-receiving cavity, collapsible means for sealing the cracks between the molds and their sections adapted to be rendered effective by closure of the press members, and means for closing off one end of the header constituted by the registrable apertures in the molds.

3. Tire vulcanizing apparatus comprising in combination, a plurality of molds each provided with a plurality of parts having registrable apertures therein, one of said parts of each mold being in communication with its tire-receiving cavity, and means for closing off the apertures between the parts of each mold and also between the molds whereby to constitute the registering apertures a main header for supplying fluid under pressure to the interior of tire casings within the plurality of molds.

4. A tire vulcanizing mold having outer separable sections and an intermediate section adapted to close off the space between the outer sections adjacent their inner periphery, the several sections being provided with registrable ducts, and the intermediate section being provided with a branch passage in communication with the tire-receiving cavity between the outer mold sections.

Signed at New York city, county of New York, and State of New York, this 8th day of October, 1923.

ERNEST HOPKINSON.